United States Patent
Liou et al.

(10) Patent No.: US 7,733,642 B2
(45) Date of Patent: Jun. 8, 2010

(54) WATERPROOF CASING FOR A FLAT PANEL DISPLAY

(75) Inventors: Guan-De Liou, Taipei (TW); Chia-Pine Huang, Keelung (TW); Li-Li Lai, Taipei (TW); Stephen Tsai, Taipei County (TW)

(73) Assignee: Hannspree, Inc., Taipei (TW)

( * ) Notice: Subject to any disclaimer, the term of this patent is extended or adjusted under 35 U.S.C. 154(b) by 687 days.

(21) Appl. No.: 11/704,608

(22) Filed: Feb. 8, 2007

(65) Prior Publication Data

US 2008/0094786 A1  Apr. 24, 2008

(30) Foreign Application Priority Data

Oct. 19, 2006  (TW) ............................... 95138560 A

(51) Int. Cl.
G06F 1/16 (2006.01)
(52) U.S. Cl. ............................... 361/679.41; 361/679.4; 206/305; 206/320; 367/131
(58) Field of Classification Search ............ 361/679.21, 361/679.41; 174/525; 367/131
See application file for complete search history.

(56) References Cited

U.S. PATENT DOCUMENTS

| | | | | |
|---|---|---|---|---|
| 4,298,204 A | * | 11/1981 | Jinkins | 277/641 |
| 5,583,742 A | * | 12/1996 | Noda et al. | 361/679.21 |
| 5,713,466 A | * | 2/1998 | Tajima | 206/320 |
| 6,132,367 A | * | 10/2000 | Adair | 600/101 |
| 6,659,274 B2 | | 12/2003 | Enners | |
| 6,954,405 B2 | * | 10/2005 | Polany et al. | 367/131 |
| 6,995,976 B2 | * | 2/2006 | Richardson | 345/173 |
| 7,158,376 B2 | * | 1/2007 | Richardson et al. | 361/679.56 |
| 7,312,984 B2 | * | 12/2007 | Richardson et al. | 361/679.41 |
| 7,464,814 B2 | * | 12/2008 | Carnevali | 206/320 |
| 2004/0120219 A1 | * | 6/2004 | Polany et al. | 367/131 |
| 2007/0115619 A1 | * | 5/2007 | Wang et al. | 361/679 |

* cited by examiner

Primary Examiner—Jayprakash N Gandhi
Assistant Examiner—Anthony Q Edwards
(74) Attorney, Agent, or Firm—Christie, Parker & Hale, LLP

(57) ABSTRACT

A waterproof casing includes a first casing having a first base wall and a first surrounding wall, and a second casing having a second base wall and a second surrounding wall. The first surrounding wall surrounds a periphery of the first base wall to cooperatively define a first receiving recess therewith, and has a first wall surface confronting the first receiving recess, and a first groove provided in the first wall surface. The second surrounding wall is connected to the second base wall proximate to the first surrounding wall to cooperatively define a second receiving recess therewith, and has a second wall surface outwardly of the second receiving recess, and a second groove provided in the second wall surface and corresponding to the first groove. A resilient member is fitted between and closes the first and second grooves. The first and second receiving recesses cooperatively receive a flat panel display.

22 Claims, 9 Drawing Sheets

WATERPROOF CASING FOR A FLAT PANEL DISPLAY

CROSS-REFERENCE TO RELATED APPLICATION

This application claims priority of Taiwanese Application No. 095138560, filed on Oct. 19, 2006.

BACKGROUND OF THE INVENTION

1. Field of the Invention

The invention relates to a waterproof casing, more particularly to a waterproof casing adapted for use with a flat panel display.

2. Description of the Related Art

In order for displays to be used in outdoor or damp environments, such as bathrooms, swimming pools, etc., to provide audiovisual entertainment to users/viewers, a current approach is to enclose the display in a sealing device.

FIGS. 1 and 2 show a sealing device 91 disclosed in R.O.C. patent publication no. 363804. The sealing device 91 includes a hollow viewing frame 911, a surrounding waterproof gasket 912 with a rear side provided with a corrugated portion, and a hollow tightening plate 913. The hollow viewing frame 911 has a window 914 extending therethrough and corresponding to a display panel of a display 92, and a surrounding insertion groove 915 provided in a rear side thereof and adjacent to a periphery of the window 914 for receiving the surrounding waterproof gasket 912. The tightening plate 913 has an opening 916 extending therethrough.

During assembly, the display 92 is sandwiched between the surrounding waterproof gasket 912 and the tightening plate 913, and the tightening plate 913 and the hollow viewing frame 911 are screwed together using screws such that the display 92 and the sealing device 91 are secured firmly together. By means of the corrugated portion on the rear side of the surrounding waterproof gasket 912, the surrounding waterproof gasket 912 and the display 92 can be brought into a tight contact with each other to prevent entry of water moisture through the window 914.

However, since the viewing frame 911, the surrounding waterproof gasket 912 and the tightening plate 913 are all configured as hollow structures to facilitate viewing and external connection to peripheral equipment, exposed portions of the display 92 are not protected and are not proof against water and dampness.

FIGS. 3 and 4 show a first embodiment of a sealing device 93 disclosed in U.S. Pat. No. 6,659,274. The sealing device 93 includes a hollow casing 931, a cover 932, and a seal 933. The hollow casing 931 has a receiving space 934 for receiving a display (not shown), and an opening 935 and a peripheral insertion groove 936 that are respectively formed in a surface and an inner peripheral face of the hollow casing 931 and that are communicated with the receiving space 934. The cover 932 includes a head portion 937 disposed to close the opening 935, and an extension portion 938 that is connected to the head portion 937 and that extends into the receiving space 934. The seal 933 is fitted around the extension portion 938, and may be correspondingly inserted into the insertion groove 936 to prevent entry of water moisture through a clearance present between the head portion 937 and the hollow casing 931.

However, since the sealing device 93 is of an enclosure type, a display using the sealing device 93 cannot be connected externally to peripheral equipment, thereby rendering the applicability of the sealing device 93 unsatisfactory.

FIGS. 5 and 6 show a second embodiment of a sealing device 95 of the aforesaid U.S. Pat. No. 6,659,274. The sealing device 95 includes an upper casing 951 and a lower casing 952 that are interconnected to cooperatively define a receiving space 956 for receiving a display (not shown), and a seal 953. The upper casing 951 and the lower casing 952 are connected pivotally at front sides thereof such that they can be opened and closed relative to each other. Furthermore, the upper casing 951 has a groove 954 formed in a wall surface thereof which is adjacent to the lower casing 952. The lower casing 952 has a groove 955 formed in a wall surface thereof which is adjacent to the upper casing 951 and which corresponds to the groove 954 in the upper casing 951 in configuration. The seal 953 is configured to match the combined shape of the grooves 954, 955, and is inserted between the grooves 954, 955 to prevent entry of water moisture through gaps at the rear, left and right sides of the upper and lower casings 951, 952.

However, since the pivot joint between the upper and lower casings 951, 952 of the sealing device 95 is not provided with waterproofing means, the waterproofing and dampness-resisting effects cannot be positively achieved. In addition, as the sealing device 95 is also of an enclosure type, the display using the sealing device 95 cannot be connected externally to peripheral equipment, and the applicability of the sealing device 95 is thus not satisfactory.

SUMMARY OF THE INVENTION

Therefore, the first object of the present invention is to provide a waterproof casing for a flat panel display, which can keep out water moisture and dampness.

According to one aspect, the waterproof casing for a flat panel display of the present invention includes a first casing, a second casing, and a surrounding resilient member.

The first casing includes a first base wall and a first surrounding wall. The first surrounding wall surrounds a peripheral edge of the first base wall to cooperate with the first base wall to define a first receiving recess, and has a first wall surface confronting the first receiving recess and a first groove provided in the first wall surface.

The second casing includes a second base wall and a second surrounding wall. The second base wall is spaced apart from the first base wall. The second surrounding wall extends along a peripheral edge of the second base wall and toward the first surrounding wall, cooperates with the second base wall to define a second receiving recess, and has a second wall surface outwardly of the second receiving recess and a second groove provided in the second wall surface and corresponding to the first groove.

The resilient member is fitted between and closes the first and second grooves such that the first and second receiving recesses are adapted to cooperatively receive the flat panel display.

The second object of the present invention is to provide a waterproof casing for a flat panel display, which can be connected to external peripheral equipment.

According to another aspect, the waterproof casing for a flat panel display of the present invention includes a casing unit, a surrounding resilient member, and an adapting device. The casing unit includes interconnected first and second casings that cooperatively define a receiving space, and has a through hole extending through one of the first and second casings and communicated with the receiving space. The receiving space is adapted for receiving the flat panel display. The resilient member is fitted between the first and second casings to close the receiving space. The adapting device is disposed in the receiving space of the casing unit, and has one end adapted to be connected electrically to the flat panel display and the other end extending outwardly of the through hole so as to be adapted for electrical connection to an external device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
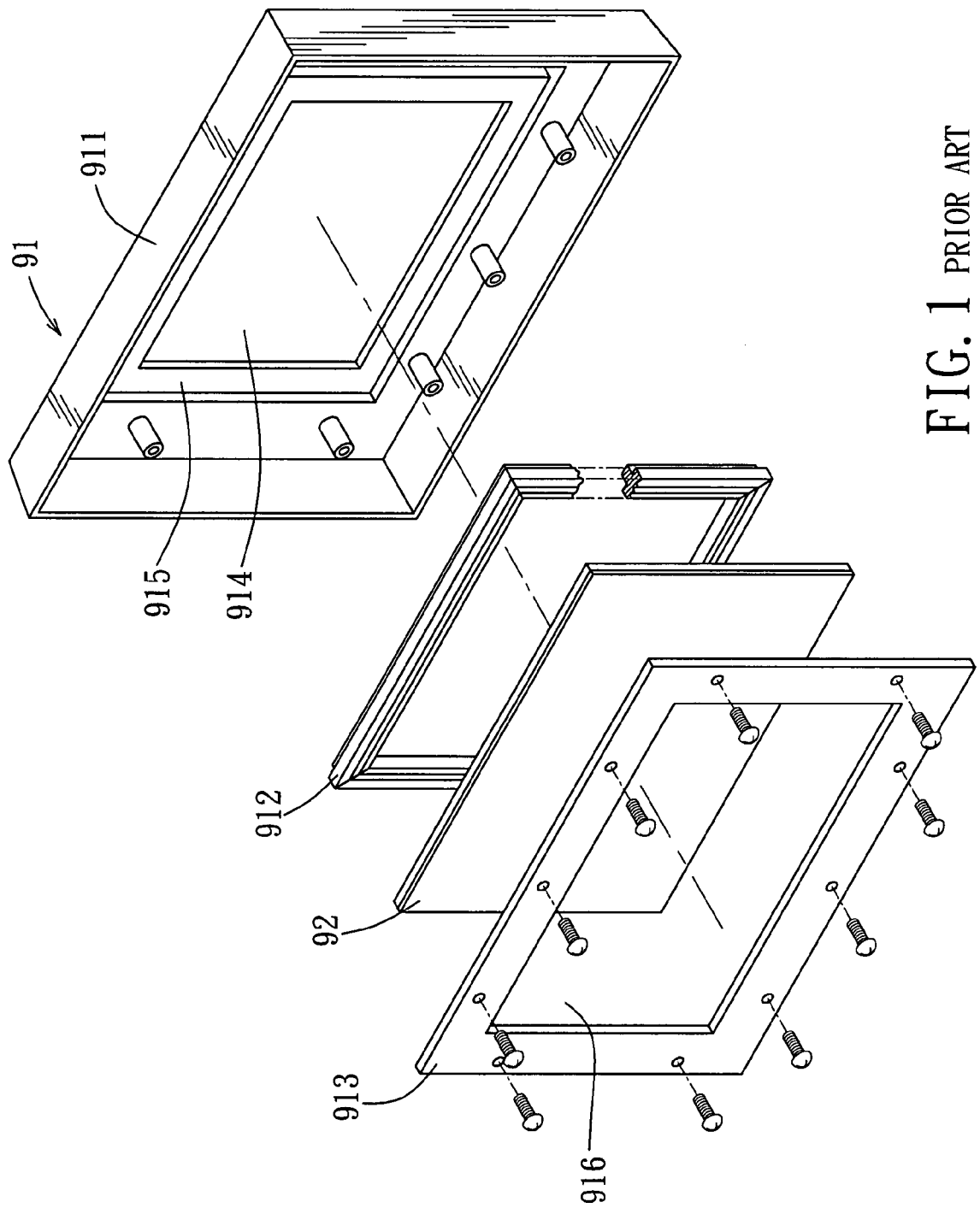
FIG. 1 is an exploded perspective view showing a conventional sealing device for a flat panel display.
Figure 2:
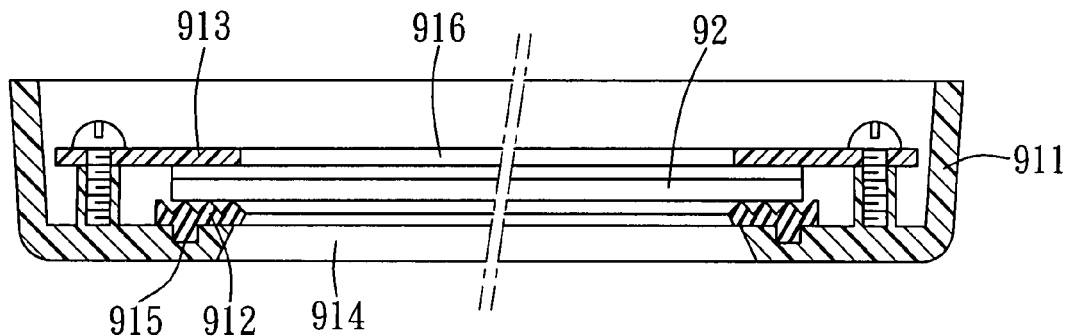
FIG. 2 is an assembled sectional view to illustrate the assembly relationship between the conventional sealing device and the flat panel display.
Figure 3:
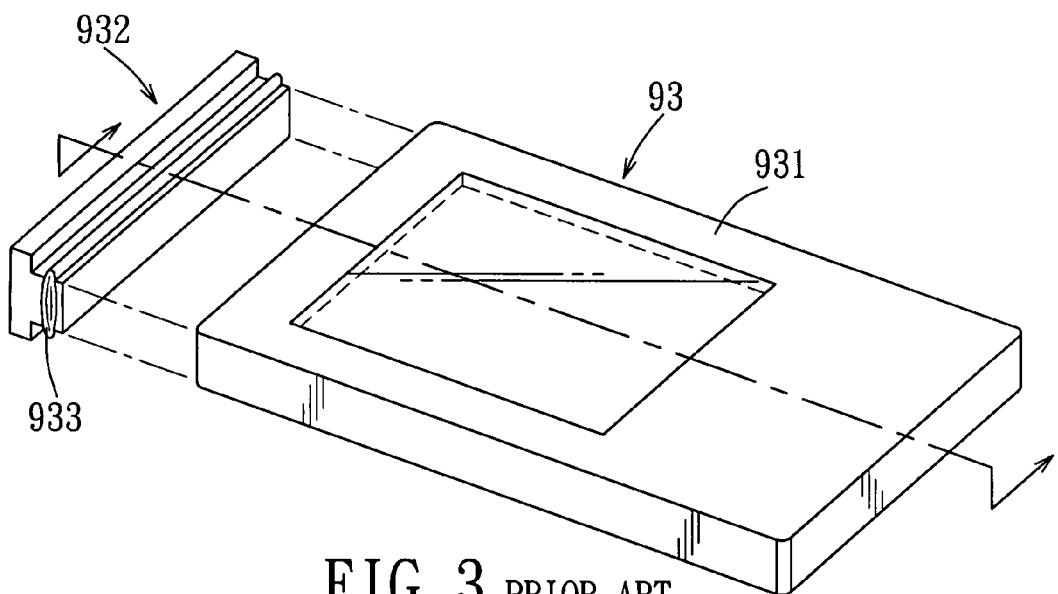
FIG. 3 is an exploded perspective view to illustrate another conventional sealing device for a flat panel display.
Figure 4:
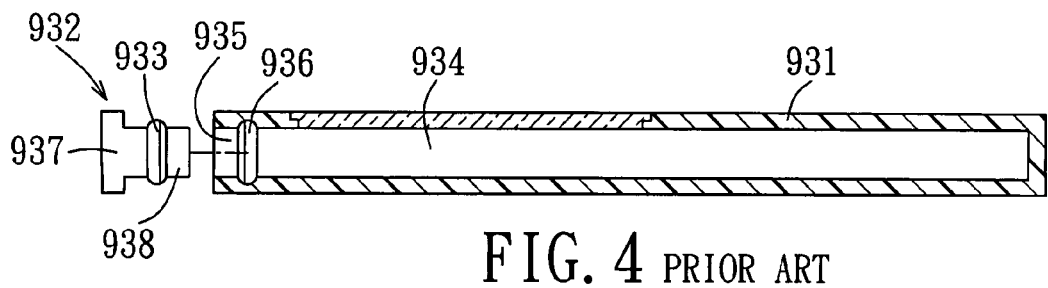
FIG. 4 is an exploded sectional view of the conventional sealing device of FIG. 3.
Figure 5:
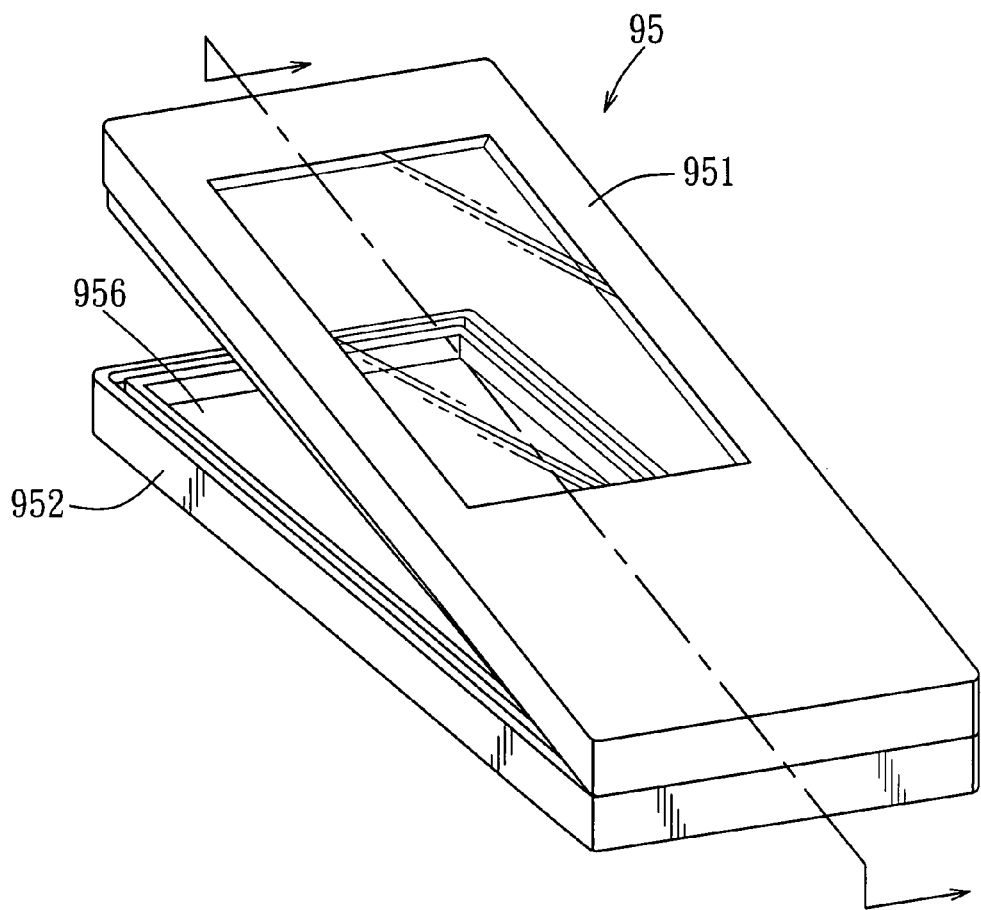
FIG. 5 is a perspective view to illustrate yet another conventional sealing device for a flat panel display.
Figure 6:
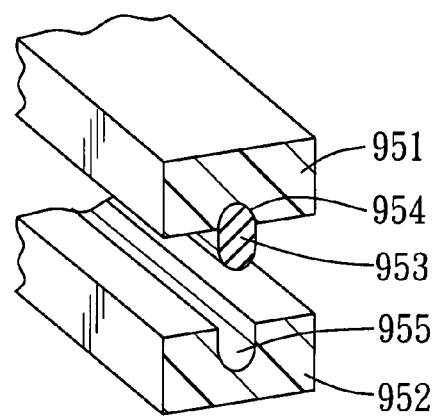
FIG. 6 is a fragmentary partly sectional view to illustrate a seal and an insertion groove of the conventional sealing device of FIG. 5.

Before the present invention is described in greater detail, it should be noted that like elements are denoted by the same reference numerals throughout the disclosure.

Figure 7:
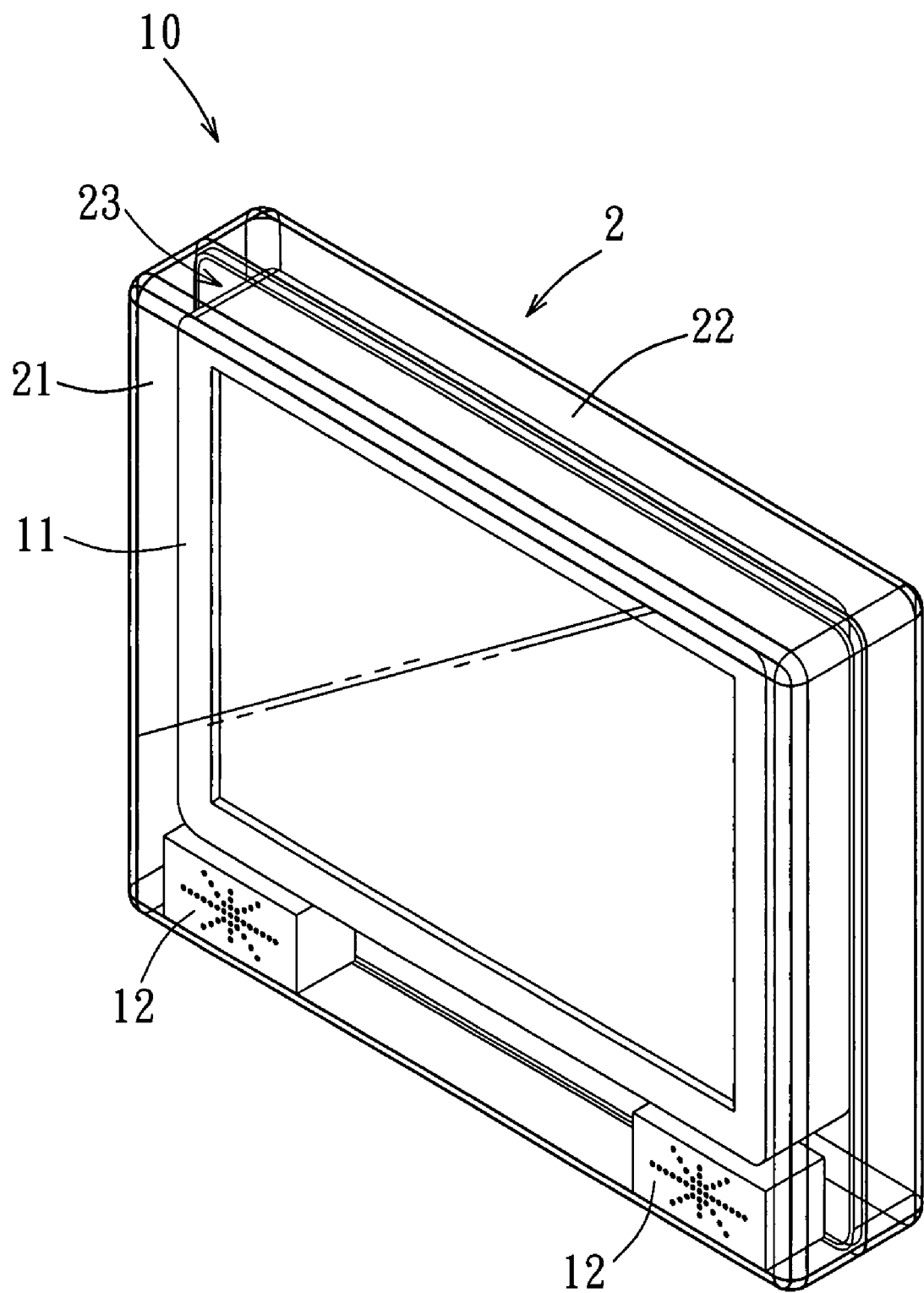
FIG. 7 is an assembled perspective view to illustrate the assembly relationship among the first embodiment of a waterproof casing for a flat panel display according to the present invention, a flat panel display, and a pair of speakers.
Figure 8:
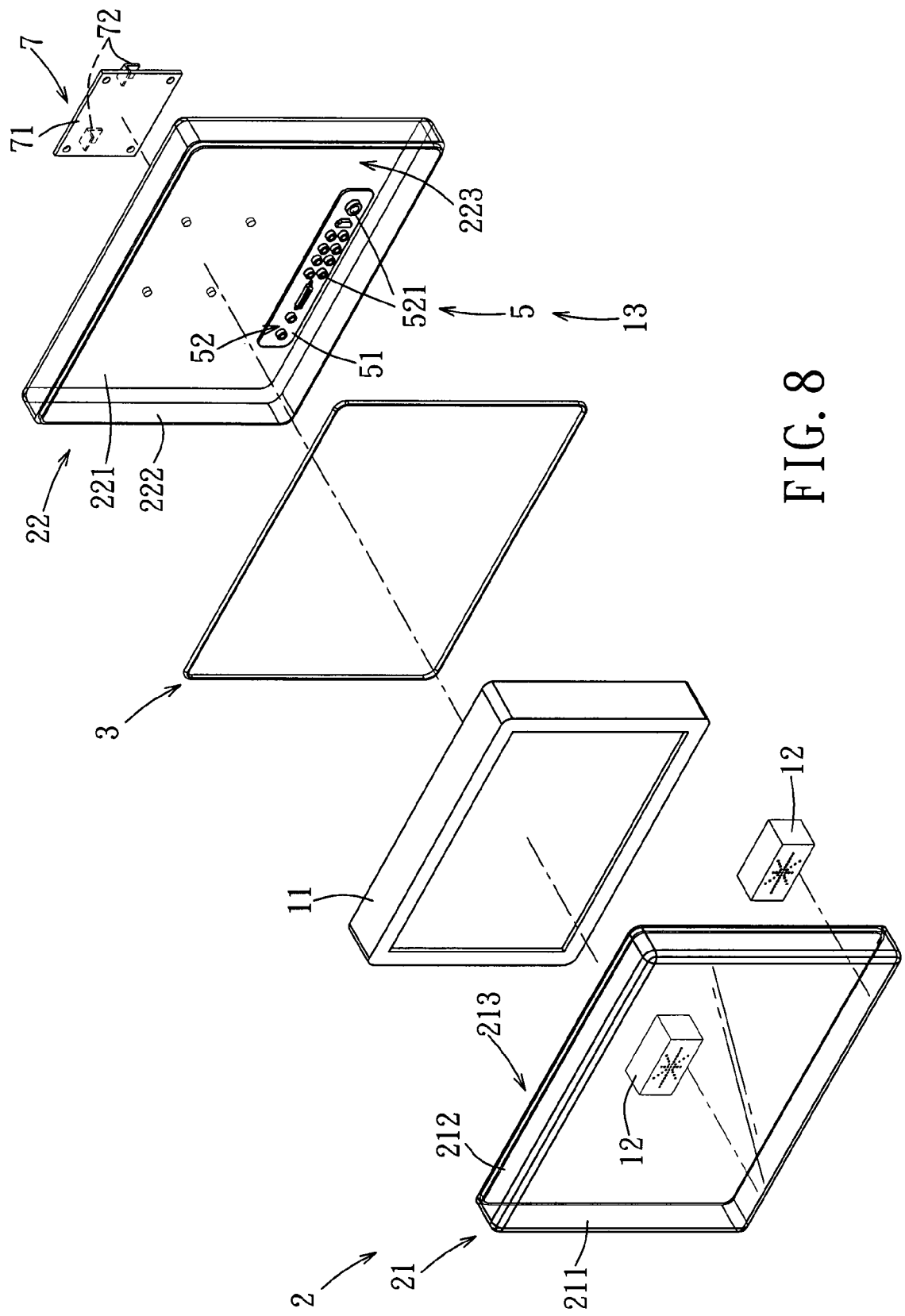
FIG. 8 is an exploded perspective view to illustrate a casing unit, an adapting unit and a wall hanging unit of the first embodiment.
Figure 11:
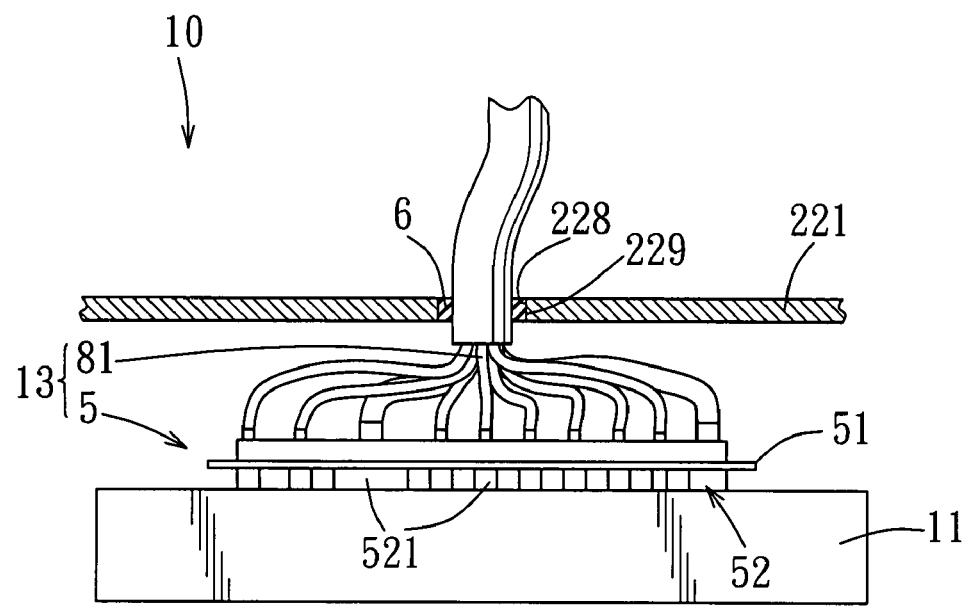
FIG. 11 is a fragmentary partly sectional view to illustrate the adapting unit, an electrical wire unit and a gasket unit.

Referring to FIGS. 7, 8 and 11, the first embodiment of a waterproof casing 10 for a flat panel display according to the present invention is adapted for receiving a flat panel display 11 (such as a liquid crystal display, a plasma display, etc.) It is noted that this embodiment has a pair of speakers 12 that is disposed within the waterproof casing 10 beneath the flat panel display 11 and that is connected electrically to the flat panel display 11 so as to provide better audio effects.

The waterproof casing 10 for a flat panel display of this invention includes a casing unit 2 (see FIG. 8), a surrounding resilient member 3 (see FIG. 8), a reinforcing fastening unit 4 (see FIG. 9), an adapting device 13 (see FIG. 11), a gasket unit 6 (see FIG. 11), and a wall hanging unit 7 (see FIG. 8).

Referring to FIG. 7, the casing unit 2 of this embodiment is formed from a transparent material, and includes a front first casing 21 and a rear second casing 22 which are interconnected to cooperatively define a receiving space 23. The receiving space 23 is provided to receive the flat panel display 11.

Figure 9:
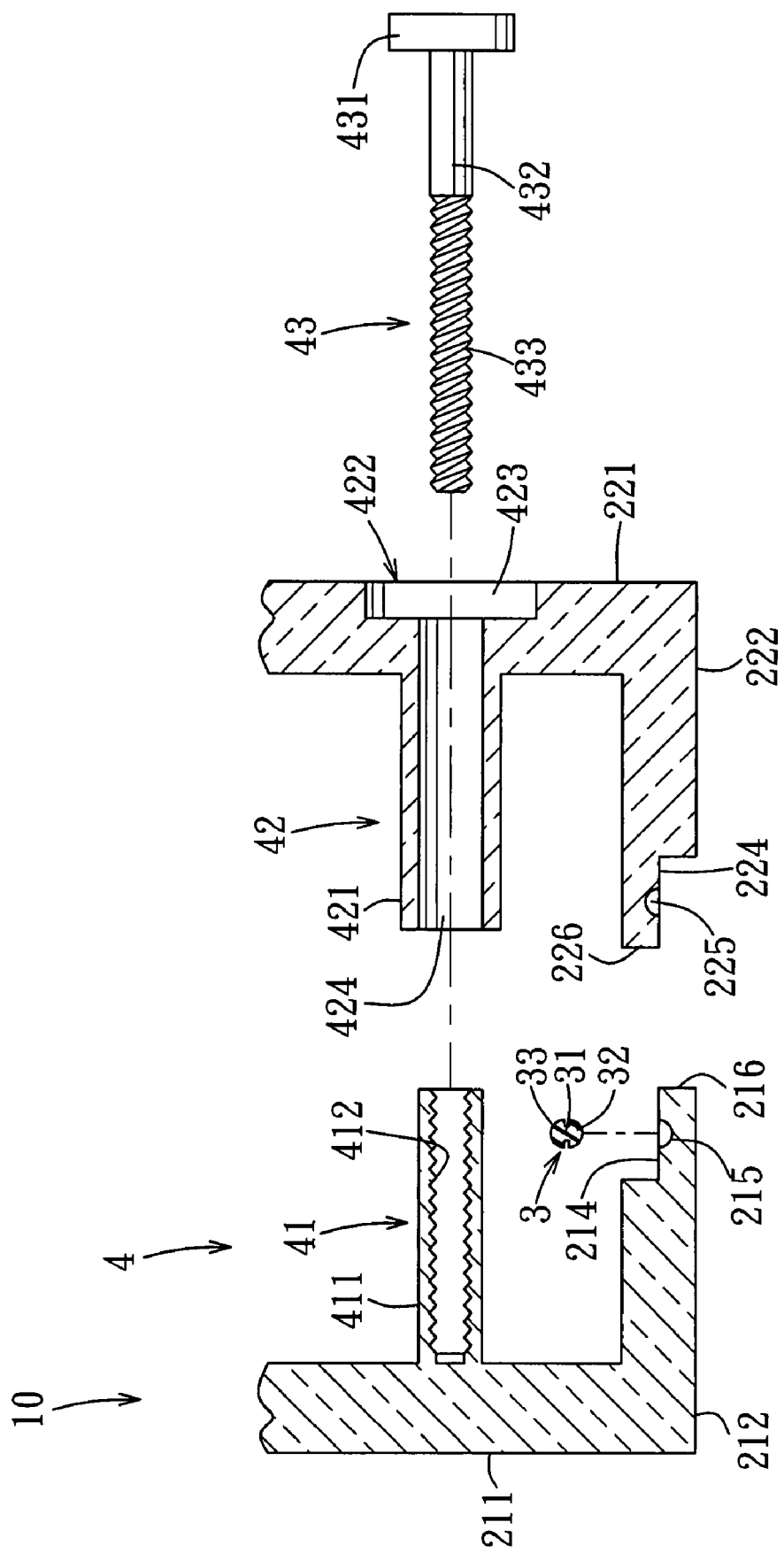
FIG. 9 is a fragmentary exploded sectional view to illustrate a resilient member and a reinforcing fastening unit of the first embodiment.
Figure 10:
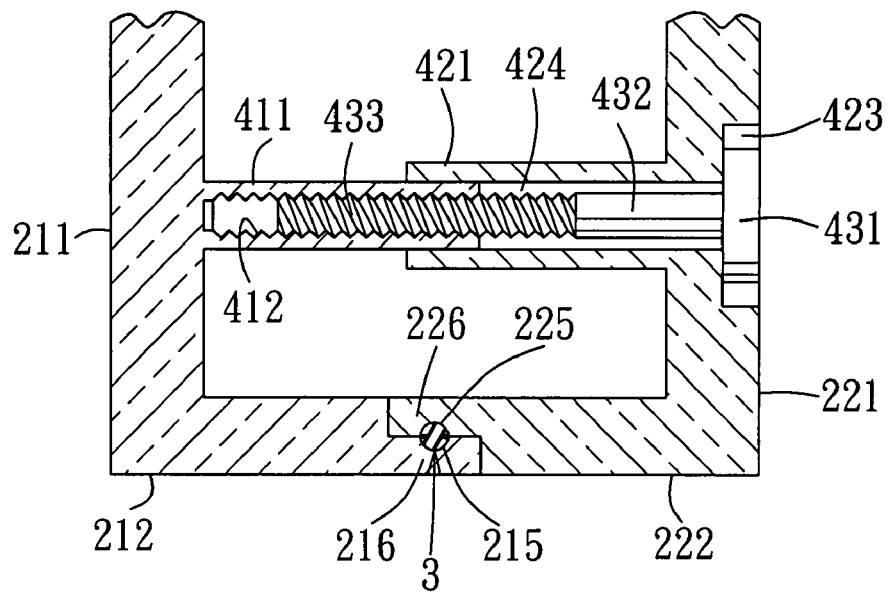
FIG. 10 is a fragmentary assembled sectional view to illustrate the assembly relationship among the resilient member, reinforcing fastening members and the casing unit.

Referring to FIGS. 8, 9, and 10, the first casing 21 includes a first base wall 211 and a first surrounding wall 212 surrounding a peripheral edge of the first base wall 211. The first base wall 211 and the first surrounding wall 212 cooperatively define a first receiving recess 213. The first surrounding wall 212 has a first wall surface 214 confronting the first receiving recess 213, and a first groove 215 formed in the first wall surface 214.

The second casing 22 includes a second base wall 221 spaced apart from the first base wall 211, a second surrounding wall 222 extending along a peripheral edge of the second base wall 221 and toward the first surrounding wall 212, and a through hole 229 (see FIG. 11) extending through the second base wall 221 in a front-and-rear direction. The second base wall 221 and the second surrounding wall 222 cooperatively define a second receiving recess 223. The second base wall 221 has a hole-defining surface 228 defining the through hole 229 (see FIG. 11).

The second surrounding wall 222 is correspondingly engageable with the first surrounding wall 212 so as to couple the first and second casings 21, 22 such that the first and second receiving recesses 213, 223 are communicated with each other to form the receiving space 23. In this embodiment, the second surrounding wall 222 has a second wall surface 224 disposed outwardly of the second receiving recess 223, and a second groove 225 formed in the second wall surface 224 and corresponding to the first groove 215 (see FIG. 9).

Referring to FIGS. 9 and 10, in this embodiment, the first surrounding wall 212 has a first extension wall portion 216 provided at an outer periphery thereof which is proximate to the second surrounding wall 222 and surrounding the first receiving recess 213. The first wall surface 214 is located on an inner side of the first extension wall portion 216.

The second surrounding wall 222 has a second extension wall portion 226 provided at an inner periphery thereof which is proximate to the first surrounding wall 212 and surrounding the second receiving recess 223. The second wall surface 224 is located on an outer side of the second extension wall portion 226.

As shown in FIG. 10, when the first casing 21 and the second casing 22 are coupled, the second extension wall portion 226 will abut against the inner side of the first extension wall portion 216 such that the first and second wall surfaces 214, 224 confront each other and such that the first and second grooves 215, 225 confront each other. At this time, the first and second surrounding walls 212, 222 engage each other to secure the first and second casings 21, 22 together.

Referring to FIGS. 8, 9 and 10, the resilient member 3 is fitted between the first and second casings 21, 22 such that the first and second grooves 215, 225 can be positively closed when the first and second casings 21, 22 are coupled so as to avoid presence of gaps between the first and second casings 21, 22 which may allow entry of water moisture thereinto. In this embodiment, the resilient member 3 is formed from a rubber material, and includes a root portion 31, and a first protrusion 32 and a second protrusion 33 that are connected to two opposite sides of the root portion 31. The first protrusion 32 is correspondingly fitted into the first groove 215, and the second protrusion 33 is correspondingly fitted into the second groove 225. Thus, when the first and second casings 21, 22 are coupled, the first and second grooves 215, 225 can be closed tightly to seal the receiving space 23, there by achieving the objective of preventing dampness.

Referring to FIGS. 9 and 10, in order to positively secure the first and second casings 21, 22 together so as to ensure that the first and second receiving recesses 213, 223 are in a tightly closed state, the waterproof casing 10 further includes the reinforcing fastening unit 4. The reinforcing fastening unit 4 includes a first fastening member 41, a second fastening member 42, and an auxiliary fastening member 43.

The first fastening member 41 functions as a nut, is integrally provided on a side of the first base wall 211 which is proximate to the second casing 22 (i.e., on a rear side of the first base wall 211), and is spaced apart from the first surrounding wall 212. The first fastening member 41 includes a hollow body 411 connected to the first base wall 211, and a threaded portion 412 formed on an inner wall surface of the hollow body 411.

The second fastening member 42 is integrally connected to the second casing 22, and corresponds to the first fastening member 41. The second fastening member 42 includes a sleeve portion 421 projecting from a side of the second base wall 221 which is proximate to the first casing 21 (i.e., a front side of the second base wall 221), and a sleeve hole 422 extending through the second base wall 221 and the sleeve portion 421 in the front-and-rear direction. The sleeve hole 422 has a head segment 423 disposed at a rear side and having a larger diameter, and a neck segment 424 disposed at a front side and having a smaller diameter for extension of the first fastening member 41 therein.

The auxiliary fastening member 43 in this embodiment is exemplified as a screw, which includes a head portion 431, a shank portion 432 connected to the head portion 431, and a threaded portion 433 formed on an outer surface of the shank portion 432. The head portion 431 of the auxiliary fastening member 43 is received in the head segment 423 of the sleeve hole 422. The shank portion 432 is extended through the neck segment 424 of the sleeve hole 422 and into the hollow body 411 of the first fastening member 41. The threaded portion 433 is threadedly engaged with the threaded portion 412 of the first fastening member 41 to thereby secure the first casing 21 and second casing 22 together.

Referring to FIGS. 8 and 11, in order that the flat panel display 11 can be connected externally to peripheral equipment, the waterproof casing 10 according to this embodiment further includes the adapting device 13. The adapting device 13 includes an adapting unit 5 received in the receiving space 23 of the casing unit 2 and adapted to be connected electrically to the flat panel display 11, and an electrical wire unit 81 connected electrically to the adapting unit 5 and extending outwardly of the through hole 229.

The adapting unit 5 includes a circuit module 51 for processing signals, and a signal transmitting unit 52 for transmitting signals.

In this embodiment, the circuit module 51 is a signal adaptor board that is mounted on the side of the second base wall 221 which is proximate to the first casing 21 (i.e., the front side of the second base wall 221) and that primarily functions to modularize the signal transmitting unit 52.

The signal transmitting unit 52 includes at least one signal transmitting member 521. The signal transmitting member 521 is provided on the circuit module 51, and is connected electrically to the circuit module 51. The signal transmitting member 521 is adapted to be plugged to the flat panel display 11 to establish electrical connection therewith so as to permit signal transmission therebetween.

It is noted here in that the signal transmitting member 521 in this embodiment may be an RCA audio signal connector, a composite video transmission connector, an S-Video transmission connector, a VGA video transmission connector, an S-terminal transmission connector, an RCA-Type video transmission connector, a D-transmission connector of the Japanese specification, a color difference transmission connector (such as Y/Pb/Pr color difference signal connector, Y/Cb/Cr color difference signal connector), a D-Sub 15-pin transmission connector, a DVI digital transmission connector (such as DVI-D digital, DVI-A analog, DVI-I digital/analog), an HDMI digital transmission connector, or a SCART (Syndicat des Constructeurs d'Appareils Radiorecepteurs et Televiseurs) transmission connector of the European specification.

The electrical wire unit 81 has one end connected electrically to the circuit module 51, and the other end extending outwardly of the through hole 229 in the second casing 22 so as to be adapted for electrical connection to an external device (not shown), such as a computer, a DVD player, a video game device, a video recorder, etc. By virtue of the connection between the adapting unit 5 of the adapting device 13 and the electrical wire unit 81, electrical connection between the flat panel display 11 and the external device can be established.

To prevent entry of water moisture into the receiving space 23 through the through hole 229 in the second casing 22, the waterproof casing 10 in this embodiment further includes the gasket unit 6, which is wrapped around the electrical wire unit 81 and which is disposed in the through hole 229 to fill any gap present between the hole-defining surface 228 of the second casing 22 and the electrical wire unit 81. In this embodiment, the gasket unit 6 is formed from a resilient material (such as rubber).

In practice, due to the provision of the adapting unit 5, the electrical wire unit 81 and the gasket unit 6, the flat panel display 11 can be completely housed within the receiving space 23 of the waterproof casing 10, and sockets or jacks (not shown) of the flat panel display 11 for signal transmission will not be exposed, thereby achieving the objective of sealing and dampness prevention.

In addition, to facilitate mounting of the flat panel display 11 together with the waterproof casing 10, the waterproof casing 10 of the present invention further includes the wall hanging unit 7, which is provided at a rear side of the second casing 22. As shown in FIG. 8, the wall hanging unit 7 includes a plate body 71 screwably locked to the rear side of the second base wall 221, and at least one hook portion 72 connected to a rear side of the plate body 71 for hanging purposes. It is noted that the hook portion 72 may be dispensed with, and the plate body 71 can be secured directly onto a structure surface (e.g., a wall surface) in a conventional manner using, without being limited to, locking fasteners or adhesives.

Figure 12:
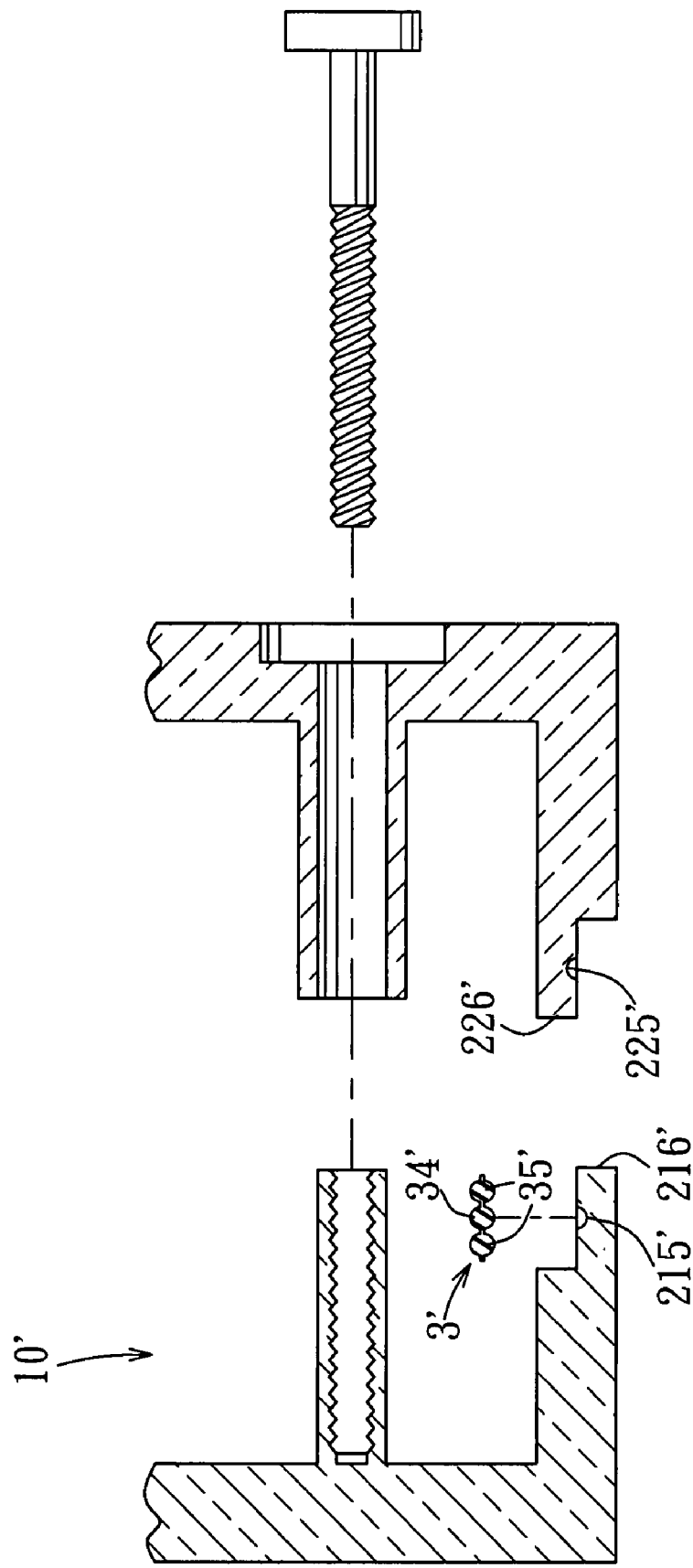
FIG. 12 is a fragmentary exploded sectional view to illustrate the second embodiment of a waterproof casing for a flat panel display according to the present invention.
Figure 13:
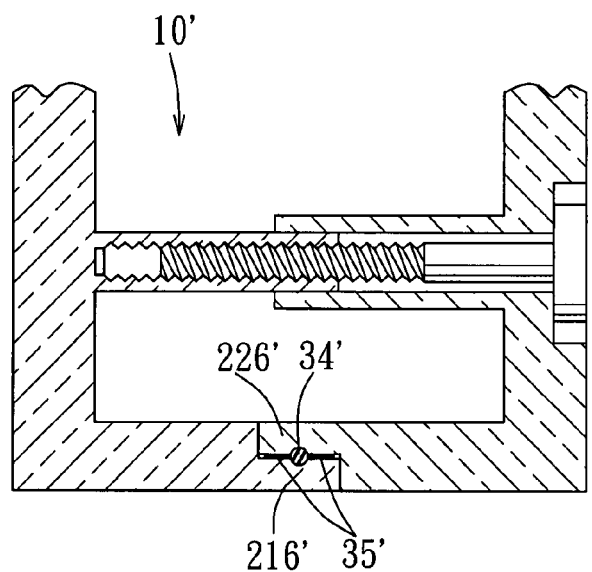
FIG. 13 is a fragmentary assembled sectional view to illustrate the assembly relationship among the resilient member, the reinforcing fastening members and the casing unit of the second embodiment.

FIGS. 12 and 13 show the second embodiment of a waterproof casing 10' for a flat panel display according to the present invention, which is substantially similar to the first embodiment in construction. In this embodiment, the resilient member 3' includes an insert body 34' inserted between the first groove 215' and the second groove 225', and two blocking portions 35' connected to front and rear sides of the insert body 34' and interposed between the first and second extension wall portions 216', 226'. When the insert body 34' is retained between the first and second grooves 215', 225', the two blocking portions 35' will be tightly pressed between the first and second extension wall portions 216', 226', thereby achieving the effect of blocking entry of water moisture.

Figure 14:
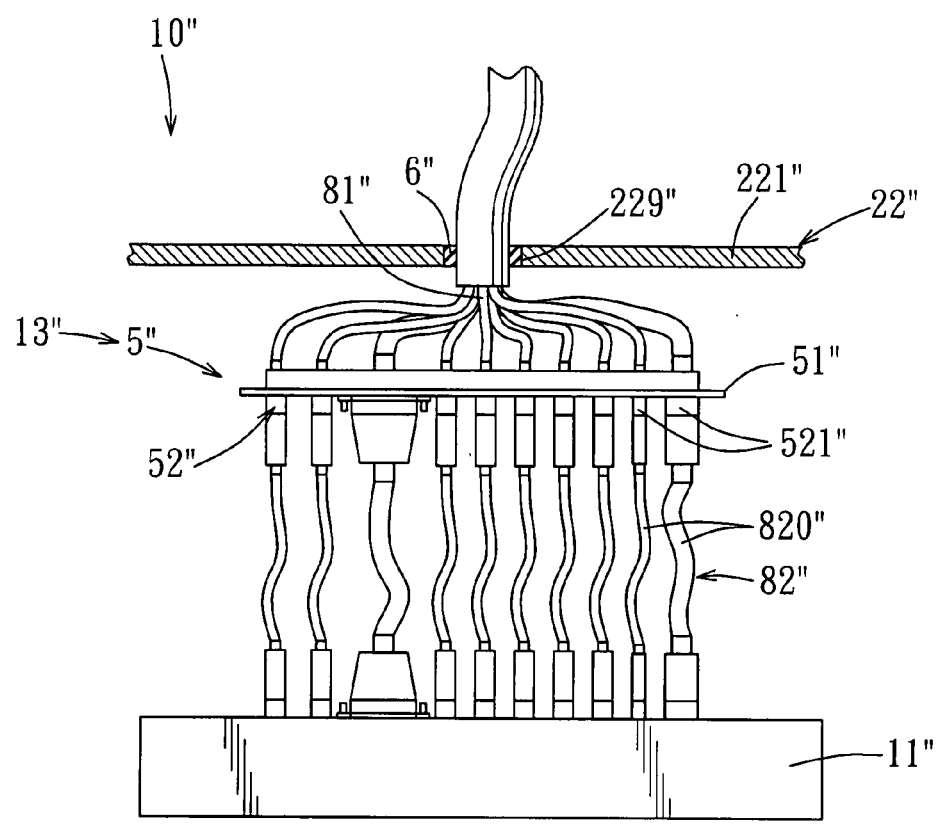
FIG. 14 is a fragmentary partly sectional view to illustrate the third embodiment of a waterproof casing for a flat panel display according to the present invention.

FIG. 14 shows the third embodiment of a waterproof casing 10" for a flat panel display according to the present invention. In this embodiment, the adapting unit 5" of the adapting device 13" is connected electrically to the flat panel display 11" and the external device through connection with the electrical wire unit 81" and a signal wire unit 82" such that transmission of signals between the flat panel display 11" and the external device is possible.

Specifically, the adapting unit 5" includes a circuit module 51" disposed at the front side of the second base wall 221" for processing signals, and a signal transmitting unit 52" disposed on the circuit module 51" and connected electrically to the circuit module 51" for transmitting signals. The signal transmitting unit 52" includes at least one signal transmitting member 521".

In this embodiment, the signal transmitting member 521" may be in the form of an RCA audio signal connector, a composite video connector, an S-Video connector, a VGA video connector, an S connector, an RCA-Type video connector, a D-connector of the Japanese specification, a color difference connector (such as Y/Pb/Pr color difference connector, Y/Cb/Cr color difference connector), a D-Sub 15-pin connector, a DVI digital connector (such as DVI-D digital, a DVI-A analog, a DVI-I digital/analog), an HDMI digital connector, or a SCART (Syndicat des Constructeurs d'Appareils Radiorecepteurs et Televiseurs) connector of the European specification.

Corresponding to the signal transmitting member 521" of the adapting unit 5", the signal wire unit 82" may include at least one signal transmission line 820" having two opposite ends connected respectively to the flat panel display 11" and the signal transmitting member 521" to thereby establish electrical connection between the flat panel display 11" and the adapting unit 5".

It is noted herein that the signal transmission line 820" of this embodiment may be in the form of an RCA audio signal wire, a composite video transmission wire, an S-Video transmission wire, a VGA video transmission wire, an S terminal transmission wire, an RCA-Type video transmission wire, a D-transmission wire of the Japanese specification, a color difference transmission wire (such as Y/Pb/Pr color difference signal wire, Y/Cb/Cr color difference signal wire), a D-Sub 15-pin transmission wire, a DVI digital transmission wire (such as DVI-D digital, DVI-A analog, DVI-I digital/analog), an HDMI digital transmission wire, or a SCART (Syndicat des Constructeurs d'Appareils Radiorecepteurs et Televiseurs) transmission wire of the European specification.

The electrical wire unit 81" has one end connected electrically to the circuit module 51" and the other end extending out of the through hole 229" in the second casing 22", is wrapped in the gasket unit 6", and is adapted for electrical connection to an external device (not shown), such as a computer, a DVD player, a video game device, a video recorder, etc. By virtue of the connection among the adapting unit 5" of the adapting device 13", the signal wire unit 82" and the electrical wire unit 81", signal transmission between the flat panel display 11" and the external device is possible.

In practice, due to the provision of the adapting unit 5", the electrical wire unit 81", the signal wire unit 82", and the gasket unit 6", the flat panel display 11" can be completely housed within the receiving space of the waterproof casing 10", and sockets or jacks (not shown) of the flat panel display 11" for signal transmission will not be exposed, thereby achieving the object of sealing the flat panel display 11" and keeping out dampness.

In sum, the waterproof casing for a flat panel display according to the present invention utilizes a surrounding resilient member fitted between two grooves of the two casings to close the grooves so as to seal the receiving space against dampness. Preferably, the waterproof casing for a flat panel display according to the present invention further includes a reinforcing fastening unit to ensure that the two casings are secured firmly together so as to maintain the receiving space in a sealed state. In addition, through the cooperation among the adapting unit, the electrical wire unit, the signal wire unit, and the gasket unit, the waterproof casing for a flat panel display according to the present invention allows the flat panel display to be completely housed within the receiving space and protected by the casing, and the flat panel display can be connected to external peripheral equipment to provide good applicability.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A waterproof casing for a flat panel display, comprising:
   a first casing including
      a first base wall, and
         a first surrounding wall surrounding a peripheral edge of said first base wall and cooperating with said first base wall to define a first receiving recess, said first surrounding wall having a first wall surface confronting said first receiving recess and a first groove provided in said first wall surface;
      a second casing including
      a second base wall spaced apart from said first base wall, and
   a second surrounding wall extending along a peripheral edge of said second base wall and toward said first surrounding wall, and cooperating with said second base wall to define a second receiving recess, said second surrounding wall having a second wall surface outwardly of said second receiving recess, and a second groove provided in said second wall surface and corresponding to said first groove; and
      a surrounding resilient member fitted between and closing said first and second grooves such that said first and second receiving recesses are adapted to cooperatively receive the flat panel display.

2. The waterproof casing for a flat panel display according to claim 1, wherein:
   said first surrounding wall has a first extension wall portion disposed at an outer periphery thereof proximate to said second casing and surrounding said first receiving recess, said first wall surface being located on an inner side of said first extension wall portion; and
   said second surrounding wall has a second extension wall portion disposed at an inner periphery thereof proximate to said first casing and surrounding said second receiving recess, said second extension wall portion abutting against said inner side of said first extension wall portion, said second wall surface being located on an outer side of said second extension wall portion and confronting said first wall surface, said first groove confronting said second groove.

3. The waterproof casing for a flat panel display according to claim 1, wherein said resilient member includes a root portion, and a first protrusion and a second protrusion connected to two opposite sides of said root portion, said first protrusion being fitted into said first groove, said second protrusion being fitted into said second groove.

4. The waterproof casing for a flat panel display according to claim 1, wherein said resilient member includes an insert body fitted between said first and second grooves, and at least one blocking portion connected to said insert body and interposed between said first and second wall surfaces.

5. The waterproof casing for a flat panel display according to claim 1, further comprising a reinforcing fastening unit to secure said first and second casings firmly together, said reinforcing fastening unit including:
- a first fastening member including a hollow body connected to a side of said first base wall which is proximate to said second casing, and a threaded portion formed on an inner wall surface of said hollow body;
- a second fastening member including a sleeve portion projecting from a side of said second base wall which is proximate to said first casing, and a sleeve hole extending through said second base wall and said sleeve portion for receiving said hollow body; and
- an auxiliary fastening member extending through said sleeve hole and into said hollow body, and including a threaded portion formed on an outer surface thereof to engage said threaded portion of said first fastening member such that said first and second casings are capable of being secured firmly together.

6. The waterproof casing for a flat panel display according to claim 1, wherein said first and second casings are formed from a transparent material.

7. The waterproof casing for a flat panel display according to claim 1, wherein one of said first and second casings has a through hole extending through a corresponding one of said first and second base walls and communicated with a corresponding one of said first and second receiving recesses, said waterproof casing further comprising:
- an adapting unit disposed in said first and second receiving recesses and adapted to be connected electrically to the flat panel display for transmitting and processing signals; and
- an electrical wire unit having one end connected electrically to said adapting unit and the other end extending outwardly of said through hole.

8. The waterproof casing for a flat panel display according to claim 7, further comprising a gasket unit wrapped around said electrical wire unit and corresponding to said through hole in position so as to provide a tight seal between said electrical wire unit and said one of said first and second casings.

9. The waterproof casing for a flat panel display according to claim 7, wherein said adapting unit includes a circuit module for processing signals, and a signal transmitting unit for transmitting signals;
- said circuit module being accommodated within said first and second receiving recesses and being connected electrically to said electrical wire unit; and
- said signal transmitting unit including at least one signal transmitting member, said signal transmitting member being disposed on and being connected electrically to said circuit module and adapted to be connected electrically to the flat panel display.

10. The waterproof casing for a flat panel display according to claim 1, wherein one of said first and second casings has a through hole extending through a corresponding one of said first and second base walls and communicated with a corresponding one of said first and second receiving recesses, said waterproof casing further comprising:
- an adapting unit disposed in said first and second receiving recesses for transmitting and processing signals;
- a signal wire unit adapted to establish electrical connection between said adapting unit and the flat panel display; and
- an electrical wire unit having one end connected electrically to said adapting unit and the other end extending outwardly of said through hole.

11. The waterproof casing for a flat panel display according to claim 10, further comprising a gasket unit wrapped around said electrical wire unit and corresponding to said through hole in position so as to provide a tight seal between said adapting unit and said one of said first and second casings.

12. The waterproof casing for a flat panel display according to claim 10, wherein said adapting unit includes a circuit module for processing signals and a signal transmitting unit for transmitting signals, said circuit module being mounted in said first and second receiving recesses, said signal transmitting unit including at least one signal transmitting member disposed on said circuit module and connected electrically to said circuit module;
- said signal wire unit including at least one signal transmission line for establishing electrical connection between said signal transmitting member and the flat panel display;
- said electrical wire unit being connected electrically to said circuit module.

13. A waterproof casing for a flat panel display, comprising:
- a casing unit including interconnected first and second casings that cooperatively define a receiving space, and having a through hole extending through one of said first and second casings and communicated with said receiving space, said receiving space being adapted for receiving the flat panel display;
- a surrounding resilient member fitted between said first and second casings to close said receiving space; and
- an adapting device disposed in said receiving space of said casing unit and having one end adapted to be connected electrically to the flat panel display and the other end extending outwardly of said through hole so as to be adapted for electrical connection to an external device, wherein said adapting device includes:
- an adapting unit mounted in said receiving space of said casing unit and adapted to be connected electrically to the flat panel display; and
- an electrical wire unit having one end connected electrically to said adapting unit and the other end extending outwardly of said through hole for establishing electrical connection to the external device, and wherein said adapting unit includes a circuit module and a signal transmitting unit,
- said circuit module being disposed in said receiving space and being connected electrically to said electrical wire unit, and
- said signal transmitting unit including at least one signal transmitting member, said signal transmitting member being disposed on and being connected electrically to said circuit module and being adapted to be connected electrically to the flat panel display.

14. The waterproof casing for a flat panel display according to claim 13, further comprising a gasket unit wrapped around said adapting device and corresponding to said through hole in position so as to provide a tight seal between said adapting device and said casing unit.

15. The waterproof casing for a flat panel display according to claim 13, wherein said casing unit is formed from a transparent material.

16. The waterproof casing for a flat panel display according to claim 13, wherein:
- said first casing includes a first base wall and a first surrounding wall surrounding a peripheral edge of said first base wall and cooperating with said first base wall to cooperatively define a first receiving recess, said first surrounding wall having a first wall surface confronting said first receiving recess and a first groove provided in said first wall surface;
- said second casing includes a second base wall spaced apart from said first base wall and a second surrounding wall extending along a peripheral edge of said second base wall and toward said first surrounding wall, said second base wall and said second surrounding wall cooperatively defining a second receiving recess, said second surrounding wall having a second wall surface outwardly of said second receiving recess, and a second groove provided in said second wall surface and corresponding to said first groove; and
- said resilient member is fitted between and closes said first and second grooves.

17. The waterproof casing for a flat panel display according to claim 16, wherein:
- said first surrounding wall has a first extension wall portion disposed at an outer periphery thereof proximate to said second casing and surrounding said first receiving recess, said first wall surface being located on an inner side of said first extension wall portion; and
- said second surrounding wall has a second extension wall portion disposed at an outer periphery thereof which is proximate to said first casing and surrounding said second receiving recess, said second extension wall portion abutting against said inner side of said first extension wall portion, said second wall surface being located on an outer side of said second extension wall portion and confronting said first wall surface, said first groove confronting said second groove.

18. The waterproof casing for a flat panel display according to claim 16, wherein said resilient member includes a root portion, and a first protrusion and a second protrusion connected to two opposite sides of said root portion, said first protrusion being fitted into said first groove, said second protrusion being fitted into said second groove.

19. The waterproof casing for a flat panel display according to claim 16, wherein said resilient member includes an insert body fitted between said first and second grooves, and at least one blocking portion connected to said insert body and interposed between said first and second wall surfaces.

20. The waterproof casing for a flat panel display according to claim 13, further comprising a reinforcing fastening unit to secure said first and second casings firmly together, said reinforcing fastening unit including:
- a first fastening member including a hollow body connected to a side of said first casing which is proximate to said second casing, and a threaded portion formed on an inner wall surface of said hollow body;
- a second fastening member including a sleeve portion projecting from a side of said second casing which is proximate to said first casing, and a sleeve hole extending through said second casing and said sleeve portion for receiving said hollow body; and
- an auxiliary fastening member extending through said sleeve hole and into said hollow body, and including a threaded portion formed on an outer surface thereof to engage said threaded portion of said first fastening member such that said first and second casings are capable of being secured firmly together.

21. The waterproof casing for a flat panel display according to claim 13, wherein said adapting device includes:
- a signal wire unit received in said receiving space and adapted to establish electrical connection between said adapting unit and the flat panel display.

22. The waterproof casing for a flat panel display according to claim 21, wherein
- said signal wire unit includes at least one signal transmission line for establishing electrical connection between said signal transmitting member and the flat panel display.

* * * * *